United States Patent [19]
Kreps

[11] 3,750,011
[45] July 31, 1973

[54] BATTERY TESTING METHOD EMPLOYING CAPACITANCE AND DISSIPATION FACTOR MEASUREMENTS

[75] Inventor: Robert W. Kreps, Kansas City, Mo.

[73] Assignee: Farmland Industries Inc., Kansas City, Mo.

[22] Filed: Mar. 20, 1972

[21] Appl. No.: 236,400

[52] U.S. Cl. ............................................. 324/29.5
[51] Int. Cl. ......................................... G01m 27/42
[58] Field of Search .................................. 324/29.5

[56] References Cited
UNITED STATES PATENTS
3,082,371  3/1963  Foust et al. ...................... 324/29.5
FOREIGN PATENTS OR APPLICATIONS
1,206,990  9/1970  Great Britain ..................... 324/29.5

Primary Examiner—Alfred E. Smith
Attorney—Schmidt, Johnson, Hovey & Williams

[57] ABSTRACT

A method for testing electrical storage batteries employs a measurement of electrical capacitance between the battery terminal posts to indicate whether the constructional quality of the battery is acceptable and, if not, to further indicate the class of defect involved, and employs a measurement of the dissipation factor of electrical capacitance between the battery terminal posts to indicate whether the degree of oxidation of the electrode plates is within acceptable limits, which measurements and indications are preferably employed in conjunction with each other when full testing of a battery is desired but may also be used separately when only testing for a particular kind of defect is desired. The method is further characterized, in that, the measurements of capacitance and dissipation factor are made while the battery is in "dry" condition without any electrolyte present therein.

4 Claims, 1 Drawing Figure

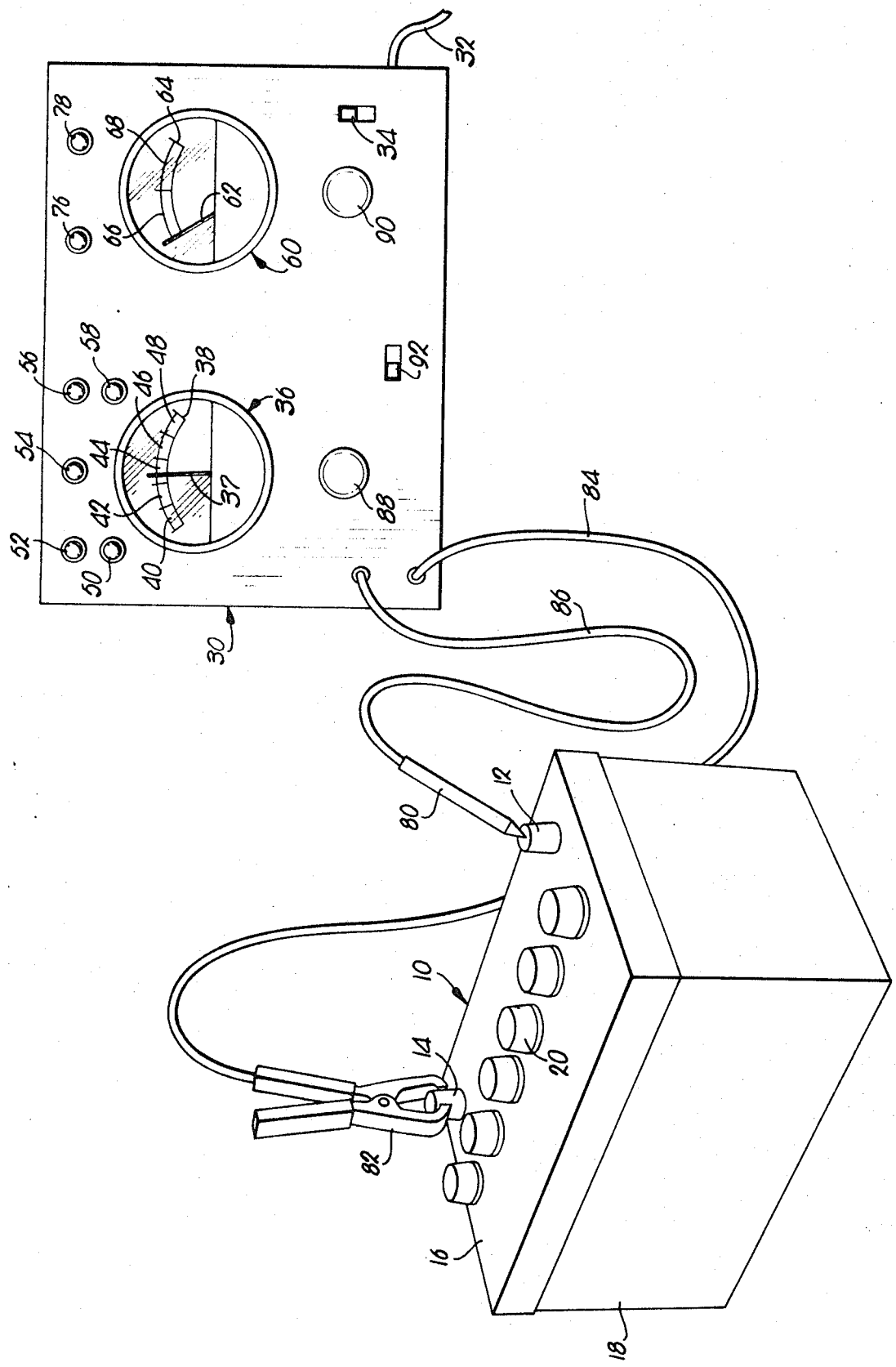

BATTERY TESTING METHOD EMPLOYING CAPACITANCE AND DISSIPATION FACTOR MEASUREMENTS

This invention relates to the testing of electrical storage batteries and, more particularly, to an improved method of testing such batteries for various defect conditions while the batteries are in a "dry" condition without electrolyte therein.

During the manufacture of electrical storage batteries, it is desirable to be able to perform quality control testing to detect constructional defects immediately after fabrication and assembly has been completed and without any necessity for introducing electrolyte into the battery as required by conventional battery testing methods. This is especially the case with batteries that are to be stored or even shipped in "dry" condition, with the battery to be later filled with electrolyte and activated only shortly prior to sale or use. It is also desirable to be able to include in the defects being tested for in an assembled battery, any condition of excessive oxidation of the battery plates which may have occurred in the plate components either prior to assembly of the battery or during storage of the assembled battery, or at both of such times.

Known testing methods for electrical storage batteries either have been of questionable accuracy, have been unable to perform testing for all of the conditions to be checked, have failed to provide any indication of the nature of a detected defect, have required the introduction of electrolyte into the battery, have required the provision of complex or expensive special purpose equipment, or have been characterized by a number of such disadvantages.

Accordingly, it is the primary object of this invention to provide an improved method for testing electrical storage batteries which overcomes the aforesaid disadvantages of prior testing methods and permits such batteries to be accurately and reliably tested for various types of possible defects, while the battery is in "dry" condition, and with the use of only well-known, widely available and relatively inexpensive types of electrical measuring instrumentation.

Further specific objects or advantages of the invention will be made clear or become apparent from the description of the invention that follows.

In the single FIGURE of the drawing, a typical electrical storage battery and the control and display panel of an illustrative embodiment of apparatus for use in performing the method of the invention are depicted somewhat schematically, for convenience of reference and to assist in visualizing the simplicity characterizing application of the method.

Among the defects in fabrication or assembly of electrical storage batteries that desirably should be detectable during quality control testing performed upon the completion of assembly of a battery are defects involving (a) either a poor electrical connection or a complete failure to effect electrical connection either between a terminal post and the set of electrode plates normally connected thereto or between some of such set of plates and the remainder thereof, (b) defects involving either a path of excessive electrical leakage or a "short circuit" between the terminal posts of the battery or between the respective sets of electrode plates normally connected to such posts, (c) defects involving an abnormal physical relationship between the electrode plates associated with the respective terminal posts which may lead to premature failure of the battery after being placed in service, and (d) defects involving excessive oxidation of electrode plates between the time of fabrication thereof and assembly of the battery.

The first of these mentioned categories of defects can arise from a terminal post that is broken or cracked within the battery assembly and, therefore, not capable of detection by visual inspection, or through breakage, cracking or faulty interconnection of the electrically conductive members employed within the battery to intercouple the electrode plates within one battery to the corresponding terminal post. The second category of mentioned defects normally will arise from the presence of a piece of electrically conductive foreign matter, such as a "lead tear" resulting from installation of a terminal post, being present within the battery and disposed in bridging relationship between a pair of electrode plates of opposite polarity. The third category of mentioned defects may arise from improper mounting or alignment of the electrode plates of one polarity with respect to those of the opposite polarity or from bends of one or more plates by which the spacing between at least certain plates of opposite polarity is less than is desired for maximum battery life. The fourth category of mentioned defects may arise from fabrication or from prolonged or improper storage of electrode plates, and a similar condition can also arise later from prolonged or improper storage of the battery after assembly thereof.

Although the first two categories of defects can be tested for in a generalized way by filling the battery with electrolyte and measuring the electrical resistance between the terminal posts of the battery, this requires the undesired step of introducing electrolyte and also often fails to provide a sufficiently sensitive quantitative measurement to reliably aid in indicating the specific nature or cause of the defect. Conventional resistance-type testing is simply not adapted to detect the third and fourth categories of defects.

It has been discovered that the disadvantages and limitations of conventional resistance testing of electrical storage batteries may all be overcome by predicating the testing measurements giving rise to the detection and identification of defects upon the electrical capacitance that is effectively presented between the terminal posts of an electrical storage battery by virtue of the spaced, interleaved relationship between the plurality of electrode plates connected with one terminal post and the plurality of electrode plates connected with the other terminal post. It has been also found that direct measurement of the value of such capacitance, which may be accomplished with any of a number of well known, widely available and relatively inexpensive capacitance measuring instruments, can be employed not only to directly detect the existence of defects, but also to give a surprisingly reliable indication of the nature and cause of the defect.

Moreover, once the equivalence of an electrical storage battery in "dry condition" to an electric capacitance is recognized, it then becomes possible to include in the testing method a procedure for detecting the troublesome excessive oxidation condition in batteries, which conventional prior battery testing methods have not even attempted to detect. Heretofore, only visual observation of the electrode plates has been conventionally used prior to assembly of the plates into a battery, which has been extremely unreliable as a means of detecting excess oxidation, and, of course, even visual inspection of the plates becomes impossible once they are assembled into a battery to be placed in inventory. The method of this invention, however, provides a convenient and effective procedure for detecting excessive oxidation on the electrode plates of even a fully assembled battery predicated upon measurement of the capacitative dissipation factor of the capacitance effectively presented between the terminal posts of an electrical storage battery in "dry condition."

In general, therefore, the method of testing electrical storage batteries provided by this invention involves the coupling of the terminal posts of the battery with any suitable means of measuring and providing a direct quantitative indication of the value of the capacitance presented between such terminal posts and the dissipation factor of such capacitance, with defects being detected and their nature indicated by the quantitative relationship of the measured values to predetermined ranges of such values that are empirically determined for each type of battery.

Referring next to the illustrative testing set-up shown in the drawing, a battery to be tested is generally indicated at 10, and conventionally includes positive and negative terminal posts 12 and 14 extending through the top 16 of a hollow battery casing 18. The top 16 is normally formed of electrical insulating material and is provided with a plurality of openings closed by filler caps 20 to permit the introduction of electrolyte into the battery 10 when it is to be placed into use. Those skilled in the art will further appreciate that the typical battery 10 internally includes within the casing 18 a plurality of electrode plates interconnected with each other and with the terminal post 12 and a second plurality of electrode plates electrically connected with each other and with the terminal post 14. The means mounting the electrode plates associated with each of the posts 12 and 14 is so arranged as to normally hold one set of plates in spaced, interleaved relationship with the other set of plates with the spacing therebetween being as uniform as reasonable manufacturing tolerances will permit. Such electrode plates are typically divided between three or more cells within the casing 18 and the internal electrical connections between the plates within each cell are arranged to provide a series connection of cells to present the desired output voltage at the terminal posts 12 and 14 when the battery 10 is activated.

One typical battery, which will be further referred to in explaining the method of this invention, is the Model YP-24 electrical storage battery manufactured and sold by Farmland Industries, Inc. of Kansas City, Mo., the assignee of this application. In that battery, adjacent electrode plates are arranged on 0.240 in. centers, the negative plates are 0.065 in. thick and the positive plates are 0.080 in. thick, providing a gap of 0.1675 in. between the surfaces of adjacent plates. It should also be noted that, in the mentioned battery, a total of 78 plates are employed, each of which has major dimensions of 4 15/16 in X 5 5/8 in.

Returning attention to the drawing, there is depicted at 30 the control and display panel of an illustrative piece of apparatus for use in practicing the method of this invention. The apparatus is provided with electrical operating power through a line cord 32 and a power switch 34. The panel carries two sets of indicators, the first of which relates to the measurement of capacitance of the battery 10 and the indication of defects detectable therefrom, while the second set pertains to the measurement of capacitative dissipation factor and to the indication of defects detectable therefrom. Basically, the first indicator preferably comprises a meter 36 having an indicating needle 37 and a calibrated scale 38, it being noted that the scale 38 is divided into 5 significant segments 40, 42, 44, 46, and 48, the specific significance of which will be later described. Preferably, but optionally, the detector associated with the capacitance measurement may also include a series of indicator lights 50, 52, 54, 56 and 58, which functionally correspond to the segments 40, 42, 44, 46 and 48 on the scale 38 of meter 36. The second indicator, which is for showing the measurement of capacitative dissipation factor preferably comprises a meter 60 having an indicating needle 62 and a calibrated scale 64 divided into two significant segments 66 and 68, and preferably also includes indicating lights 76 and 78 functionally corresponding to the segments 66 and 68.

The apparatus employed to effect a measurement of the electrical capacitance between battery posts 12 and 14 may be of any conventional nature, but typically will include a capacitance bridge circuit coupled with the meter 36 and adapted for coupling with the terminal posts 12 and 14 by means of a conductive probe 80, a battery clip 82 and lead lines 84 and 86 respectively coupled therewith. A control knob 88 may be provided on the panel 30 for use by an operator in accomplishing any "nulling" or adjustment that may be necessary in the calibration or operation of the particular type of capacitance measuring instrumentation chosen, in order to cause the indicating needle 37 of meter 36 to provide a direct reading corresponding to the electrical capacitance between the terminal posts 12 and 14.

Similarly, the electrical instrumentation to be provided for measuring the dissipation factor of the electrical capacitance between terminal posts 12 and 14 for operating the needle 62 of meter 60 to provide a direct measurement of such dissipation factor can be chosen from any of a number of such instruments that are commercially available. It may be noted that the dissipation factor of a capacitance is equal to the reciprocal of the quality factor normally known as "Q", so that one of the commonly available "Q meters" may be employed with proper provision being made for calibration of the scale 64. Another available approach, and the one currently preferred, involves deriving the dissipation factor measurement from the fact that dissipation factor in a capacitance is equal to the tangent of the deviation of phase shift produced by an unknown capacitance from the expected 90° phase shift that will be produced by a pure capacitance. A control knob 90 is shown on the display panel 30 to permit the operator to make any adjustments that may be required for "nulling" or operation of the particular type of dissipation factor measuring instrumentation that is selected.

In any event, the choice of available desired forms of instrumentation for operating the capacitance measuring meter 36 and the dissipation factor measuring meter 60, and the appropriate corresponding calibration of the scales 38 and 64, are well within the skill of the art, once the method itself is understood.

For each particular type and model of battery 10 to be tested, it is necessary to establish predetermined ranges of capacitance and capacitative dissipation factor values corresponding to such parameters for batteries of acceptable quantity, and it is also desirable to establish ranges of such values that are indicative of the existence of particular types of defects in batteries of the particular type and model to be tested. This is most conveniently done empirically by initially testing both a plurality of batteries 10 known to be of acceptable construction and quality and further pluralities of batteries known to embody particular defects. This will define the ranges of values both for acceptable batteries and for indicating particular types of defects. For example, with the above-mentioned Model YP-24 battery, it has been found that the range of capacitance values between the posts 12 and 14 of batteries of acceptable quality is from about 370 picofarads to about 440 picofarads, and that the range of acceptable dissipation factors indicating an absence of excessive oxidation of the electrode plates is from 0 to about 4.0, which is a dimensionless number expressing the dissipation factor in terms of the tangent of the deviation of phase shift from that which would be expected with a pure capacitance (if it should be desired to indicate the dissipation factor in terms of the sine of the phase shift deviation, which may be more convenient with some types of available instrumentations, the corresponding value would be 0.970). Similarly, for the Model YP-24 battery, it was thus established that a capacitance measurement greater than about 440 picofarads indicates the existence of a defect and, more particularly, that a measurement in excess of about 500 picofarads indicates substantially a "dead short" between the terminal posts 12 and 14 or the positive and negative electrode plates respectively associated therewith, while a capacitance measurement in the range of about 440 picofarads to about 500 picofarads normally indicates an excessive electrical leakage path not constituting a "dead short" between the terminal posts 12 and 14, such as might be caused by the presence of foreign matter between plates that is not of highly conductive material but which would nevertheless prevent the battery from functioning properly. Finally, such pretesting of Model YP-24 batteries with known defect conditions has established a capacitance measurement of less than about 370 picofarads as indicating an imperfect internal connection, with values within the range of 0 to about 30 picofarads indicating a complete "open circuit" and values within the range from about 30 picofarads to about 370 picofarads indicating varying degrees of imperfections in internal electrical connections or, perhaps, the absence of connection with only certain ones of the electrode plates of a given polarity such as may occur when an inter-cell plate connection is not properly effected.

It will now be understood that the acceptable range of capacitance values may be represented by the sector 44 of scale 38 of meter 36, with the above-mentioned higher capacitance ranges represented by segments 46 and 48 and the above-mentioned lower capacitance ranges represented by segments 40 and 42. Similarly, the segment 66 of calibrated scale 64 of the meter 60 represents the range of acceptable dissipation factors, while the segment 68 represents the range of dissipation factor values that indicate excessive oxidation of the electrode plates. It may conveniently now also be pointed out that each of the indicator lights 50, 52, 54, 56, and 58 may be coupled with the capacitance measuring circuitry in known manner so as to provide a quick indication of the range of capacitance value measured for the battery 10 under test; thus, the light 54 corresponding to the segment 44 of meter 36 and indicating a capacitance measurement within the acceptable range may be colored green, while the lights 52 and 56 may be colored yellow and coupled with the capacitance measuring circuitry to be energized when the measurement corresponds with operation of the indicating needle 37 into the range segment 42 or 46 respectively, while the lights 50 and 58 may be colored red and similarly coupled to be energized for capacitance measurements within the range segments 40 and 48 respectively. The lights 76 and 78 may similarly be green and red respectively and conventionally coupled with the dissipation factor measuring circuitry to provide acceptance and defect detections corresponding to the segments 66 and 68 of the meter 60.

Having established the various ranges of significant values of capacitance and dissipation factor for a given type of battery 10 (which, in general, may be expected to differ for each type and model of battery), the method of this invention then contemplates that any suitable form of known apparatus for measuring such parameters will be provided and electrically coupled with the terminal posts 12 and 14 of a battery 10 of the same type and model but of unknown quality, and that measurements of the capacitance and capacitative dissipation factor would then be made and an indication given of such measurements, in order to detect and indicate whether the battery 10 under test is of acceptable or non-acceptable quality and, if the latter, to further detect and indicate the class of defect condition existing in such battery 10. As previously noted, detected defects may be indicated in any suitable fashion, such as by quantitative readings from a calibrated scale such as scales 38 and 64 of meters 36 and 60, from significant range segments calibrated and marked onto such scales 38 and 64 as at 40, 42, 44, 46, 48, 66 and 68, or by means of condition indicator lights as at 50, 52, 54, 56, 58, 76 and 78, or by any desired combination of these or other conventional indicating means.

It may be desirable, with certain types of measuring circuitry that might be chosen for employment in practicing the method of this invention for the capacitance procedure and the dissipation factor procedure to be performed sequentially, and, in the case of batteries that have previously been tested for constructional defects, but require retesting after storage merely to verify the continuing absence of excessive oxidation of the electrode plates, no repetition of the capacitance test may be necessary or desired. Accordingly, a control switch such as indicated at 92 in the drawing may be provided in order to permit a selection between the capacitance measurement and the dissipation factor measurement procedures of the overall method.

After the detection of a defect and the indication of the class of defect involved, appropriate remedial action may be taken, if feasible for that sort of defect, or irreparably defective batteries can be reliably separated from the acceptable batteries at an early stage of the manufacturing process. The method of the invention thus effectively satisfies the requirements of quality control testing and, even when defects are discovered, oftentimes reveals such defect in time to permit either corection thereof or at least the salvaging of portions of the assembly. Most importantly, however, the method provides for a more reliable and economical manner of detecting and indicating the nature of a wider variety of possible defects than could be detected with conventional battery testing methods, and accomplishes these desirable results without requiring that the "dry" condition of the battery be altered by the introduction of electrolyte into the battery.

Having thus described the invention, what is claimed as new and desired to be secured by Letters Patent is:

1. A non-destructive method of testing a fully assembled, but electrolyte-free, electrical storage battery having a hollow casing, a pair of electrically conductive terminal posts extending through the casing from the interior to the exterior thereof in spaced, electrically insulated relationship to each other, a pair of pluralities of electrode plates within the casing, means for normally supporting the plates of one plurality thereof in spaced, interleaved, electrically insulated relationship with the plates of the other plurality thereof, and means for normally electrically connecting the plates of each respective plurality thereof together and with a corresponding terminal post, said method comprising the initial steps of:
   a. providing means for measuring the electrical capacitance between a pair of electrical terminal points; and
   b. electrically coupling said capacitance measuring means with said terminal posts of said battery to measure the electrical capacitance therebetween as an indication of the constructional quality of the battery;
   and then the further steps of:
   i providing means for measuring the amount of dissipation in an electrical capacitance connected between a pair of electrical terminal points; and
   ii electrically coupling said dissipation measuring means with said terminal posts of said battery to measure the dissipation of the capacitance therebetween as an indication of the oxidation condition of said plates.

2. The method as set forth in claim 1, including the further step of:
   iii. detecting whether the dissipation measured in step (ii) is below a predetermined value peculiar to the type of battery being tested, so as to indicate an absence of excessive oxidation of said plates.

3. A non-destructive method of testing a fully assembled, but electrolyte-free, electrical storage battery having a hollow casing, a pair of electrically conductive terminal posts extending through the casing from the interior to the exterior thereof in spaced, electrically insulated relationship to each other, a pair pluralities of electrode plates within the casing, means for normally supporting the plates of one plurality thereof in spaced, interleaved, electrically insulated relationship with the plates of the other plurality thereof, and means for normally electrically connecting the plates of each respective plurality thereof together and with a corresponding terminal post, said method comprising the steps of:
   i. providing means for measuring the amount of dissipation in an electrical capacitance connected between a pair of electrical terminal points; and
   ii. electrically coupling said dissipation measuring means with said terminal posts of said battery to measure the dissipation of the capacitance therebetween as an indication of the oxidation condition of said plates.

4. The method as set forth in claim 3, including the further step of:
   iii. detecting whether the dissipation measured in step (ii) is below a predetermined value peculiar to the type of battery being tested, so as to indicate an absence of excessive oxidation of said plates.

* * * * *